United States Patent
Brenker et al.

(10) Patent No.: US 6,231,240 B1
(45) Date of Patent: May 15, 2001

(54) CRANKSHAFT BEARING FOR AN INTERNAL COMBUSTION ENGINE

(75) Inventors: Günter Brenker, Waiblingen; Edgar Brütsch, Stuttgart; Frank Müller, Schorndorf; Robert Niklas, Weinstadt; Willy Treyz, Neckartailfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/414,695

(22) Filed: Oct. 7, 1999

(30) Foreign Application Priority Data

Oct. 8, 1998 (DE) .............................................. 198 46 387

(51) Int. Cl.$^7$ ....................................................... F02F 7/00

(52) U.S. Cl. ...................................... 384/432; 123/195 R

(58) Field of Search ................................... 384/429, 430, 384/432, 433, 434; 123/195 R

(56) References Cited

U.S. PATENT DOCUMENTS

| | | | | |
|---|---|---|---|---|
| 3,304,134 | * | 2/1967 | Allen | 384/432 |
| 4,037,888 | * | 7/1977 | Mirjanic | 384/432 |
| 4,729,352 | * | 3/1988 | Fukuo et al. | 123/195 R |
| 5,024,189 | * | 6/1991 | Ushio et al. | 123/195 R |
| 5,222,467 | * | 6/1993 | Sasada | 123/195 R X |

FOREIGN PATENT DOCUMENTS 195 45 000   4/1997 (DE) .

\* cited by examiner

Primary Examiner—Thomas R. Hannon
(74) Attorney, Agent, or Firm—Klaus J. Bach

(57) ABSTRACT

In a bearing for a crankshaft of an internal combustion engine having a crankcase including a bearing base portion with a bearing cover mounted thereon and both the bearing base portion and the bearing cover consisting of a light metal alloy, the bearing cover has removably mounted therein, adjacent the crankshaft, an insert consisting of a bearing material which has a lower coefficient of thermal expansion than the light metal alloy of which the base bearing portion and the bearing cover consist.

6 Claims, 4 Drawing Sheets

CRANKSHAFT BEARING FOR AN INTERNAL COMBUSTION ENGINE

BACKGROUND OF THE INVENTION

The invention relates to a crankshaft bearing for an internal combustion engine including a bearing base portion integrally formed with the crankcase and a bearing cover mounted thereon, and including an insert of a material having a small heat expansion coefficient.

DE 195 45 000 C1 discloses a crankshaft bearing in a crankcase of an internal combustion engine having several bearing blocks each of which comprises a bearing base portion integrally formed with the crankcase and a bearing cover mounted on the bearing base portion. The crankshaft is received between the bearing base portion and the bearing cover. The bearing base portion and the bearing cover both consist of a light metal alloy such that they have a relatively low weight, but high strength and rigidity. The bearing cover includes an insert, which extends around the crankshaft and consists of an iron-metallic material, which has a low heat expansion coefficient as compared to the light metal alloy whereby the hot bearing play normally occurring in the area of the crankshaft bearing is reduced. The insert of iron metal which is cast into the bearing cover has a high heat conductivity and transfers the friction heat generated in the bearing in the area of the bearing blocks to the surrounding light metal housing. Because of the firm interconnection between insert and bearing cover, temperature stresses are generated in the bearing cover and the insert as a result of the different heat expansion coefficients of light metal and iron metal. The crankshaft bearing can be negatively affected thereby. In the worst case, the temperature stresses may lead to a failure of a component.

It is the object of the present invention to provide a crankshaft bearing, which has a low weight and high rigidity such that bearing play variations resulting from heat expansions are minimized. It is another object of the invention to reduce the noise generated by an engine.

SUMMARY OF THE INVENTION

In a bearing for a crankshaft of an internal combustion engine having a crankcase including a bearing base portion with a bearing cover mounted thereon and both the bearing base portion and the bearing cover consisting of a light metal alloy, the bearing cover has removably mounted therein, adjacent the crankshaft, an insert consisting of a bearing material which has a lower coefficient of thermal expansion than the light metal alloy of which the base bearing portion and the bearing cover consist.

In contrast to known arrangements, the insert is not cast into the bearing cover but is removably mounted thereto. As a result, some relative movement between the insert and the bearing cover is possible whereby different heat expansions of the insert and the bearing cover can be accommodated to some degree so that temperature stresses in the interface areas between the insert and the bearing cover are reduced.

It is another advantage of the arrangement according to the invention that manufacturing and assembly of the bearing is facilitated. The insert can be manufactured separately and then be inserted into the bearing cover, which subsequently can be mounted onto the bearing base together with the insert. With the separate manufacture of the insert and the bearing cover the two manufacturing steps are independent of each other. The time required for the manufacture and the manufacturing costs are reduced.

It is also possible to utilize the whole width of the bearing base to accommodate the insert permitting the use of the arrangement also with compact engines having narrow bearing bases.

In an advantageous embodiment, the insert is provided with stepped side walls through which bearing mounting bolts may extend in order to firmly mount the insert onto the bearing base on the crankcase. The stepped arrangement also has the advantage that a firm engagement is provided with the bearing cover but temperature caused expansions are permitted in the interface area between the insert and the bearing cover. In addition, the stepped side walls permit additional fixing of the insert during machining providing for improved manufacturing accuracy.

For a firm crankshaft support, preferably four bearing bolts extend through the insert. In a preferred embodiment, the four bearing bolts interconnect the insert with the crankcase so as to strengthen the jointure between the insert and the bearing cover and to increase the overall rigidity of the bearing. This arrangement also has the advantage that the bearing cover and the insert can be assembled in one step by which they are bolted together and the mounting bolts are accessible from outside the bearing.

In another advantageous embodiment (FIG. 4), the insert is somewhat spaced from the bearing cover so that a gap is formed between the outside of the insert and the inside of the bearing cover which reduces heat and noise transfer from the insert to the bearing cover. In this case, an uncoupling of heat and noise from the bearing housing is provided for in an optimal manner.

As material to be used for manufacturing the insert any material could be considered which provides for the required strength for supporting the crankshaft and, at the same time, has a relatively small heat expansion coefficient. Those materials are particularly iron containing materials such as cast iron or compound materials.

Further advantages of the invention and suitable embodiments will be described below on the basis of the accompanying drawings.

DESCRIPTION OF PREFERRED EMBODIMENTS OF THE INVENTION

Figure 1:
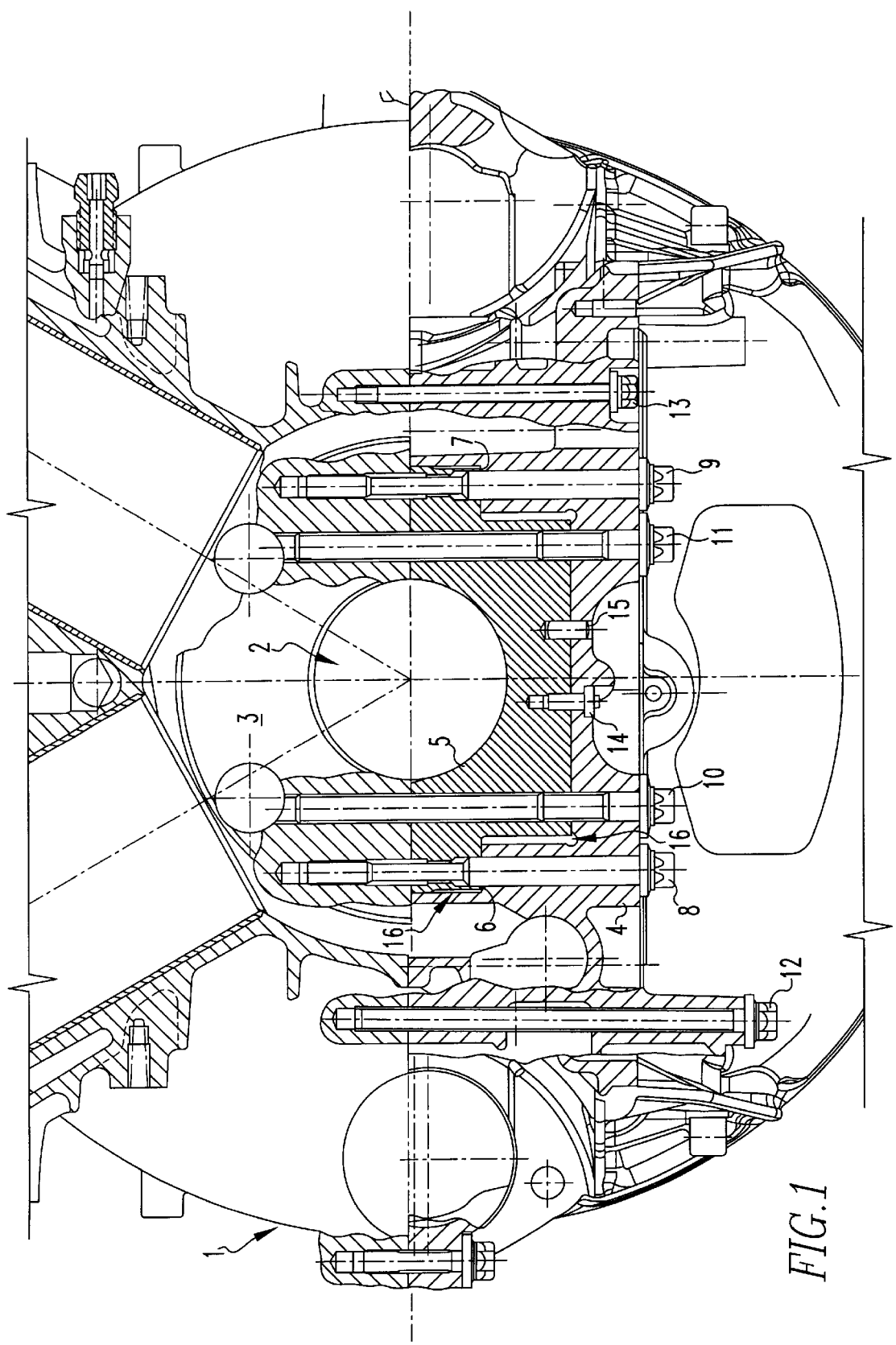
FIG. 1 is a cross-sectional view of a crankcase including a crankshaft bearing.

As shown in FIG. 1, the crankcase 1 of an internal combustion engine includes a crankshaft bearing 2, which is formed by a bearing base portion 3 and a bearing cover 4 with an insert 5 mounted to the bearing base portion 3. The crankshaft bearing 2 shown in the cross-sectional representation of FIG. 1 is part of a bearing structure of which an internal combustion engine includes several for rotatably supporting the crankshaft of the internal combustion engine. Several bearing covers 4 may be combined to form a bearing bridge for increased rigidity.

The bearing base portion 3 and the bearing cover 4 consist of a lightweight metal, particularly of an aluminum alloy or a magnesium alloy. The insert 5 received in the bearing cover 4, which has a bearing base bore for receiving the crankshaft, consists of a material which has a smaller temperature expansion coefficient than light weight metal, for example of an iron metal or a compound material. The insert 5 expands only slightly as a result of the heat generated in the crankshaft bearing 2.

It may be advantageous to provide a bearing insert of a material with a low temperature expansion coefficient also in the bearing base portion 3 for receiving the crankshaft.

The insert 5 is removably disposed in the bearing cover 4 and connected to the bearing cover 4 by bearing bolts 8, 9, 10 11 by which the cover and the insert are attached to the bearing base portion 3. The insert 5 is provided at its sides with steps 6, 7, which are disposed on correspondingly formed shoulders on the bearing cover 4. A bolt 8, 9 extends through each step 6, 7. Two additional bolts 10, 11 extend through the main part of the insert 5. The bolts 8, 9, 10, 11 are accessible from the outside of the bearing cover 5 and attach the bearing cover 4 as well as the insert 5 to the bearing base portion 3 of the crankcase 1. The bolt areas of the bearing bolts 8 to 11 on the outside of the bearing cover 8 may be disposed outside the crankshaft balancing weights. With enlarged bolt heads and bolt engagement areas a uniform force transfer of the bolt forces to the bearing cover can be achieved.

Additional bearing bolts 12 and 13 interconnect the bearing cover 4 and the bearing base 3 at opposite side of the insert 5 and provide for a bearing housing seal.

A bolt 15 and a break-away screw 14 connect the bearing cover 4 to the insert 5. In this way, it is made sure that the insert remains in a particular bearing cover after the interface surfaces have been machined and other preliminary machining has been done.

The side surface of the insert 5 are disposed on the seating area of the bearing cover 4 with some clearance so that between adjacent side surfaces of the bearing cover 4 and the insert 5 there remains an air gap 16. With the air gap 16 different thermal expansion rates of the bearing cover 4 and the insert 5 can be accommodated and the transfer of noise generating vibrations can be reduced.

Figure 2:
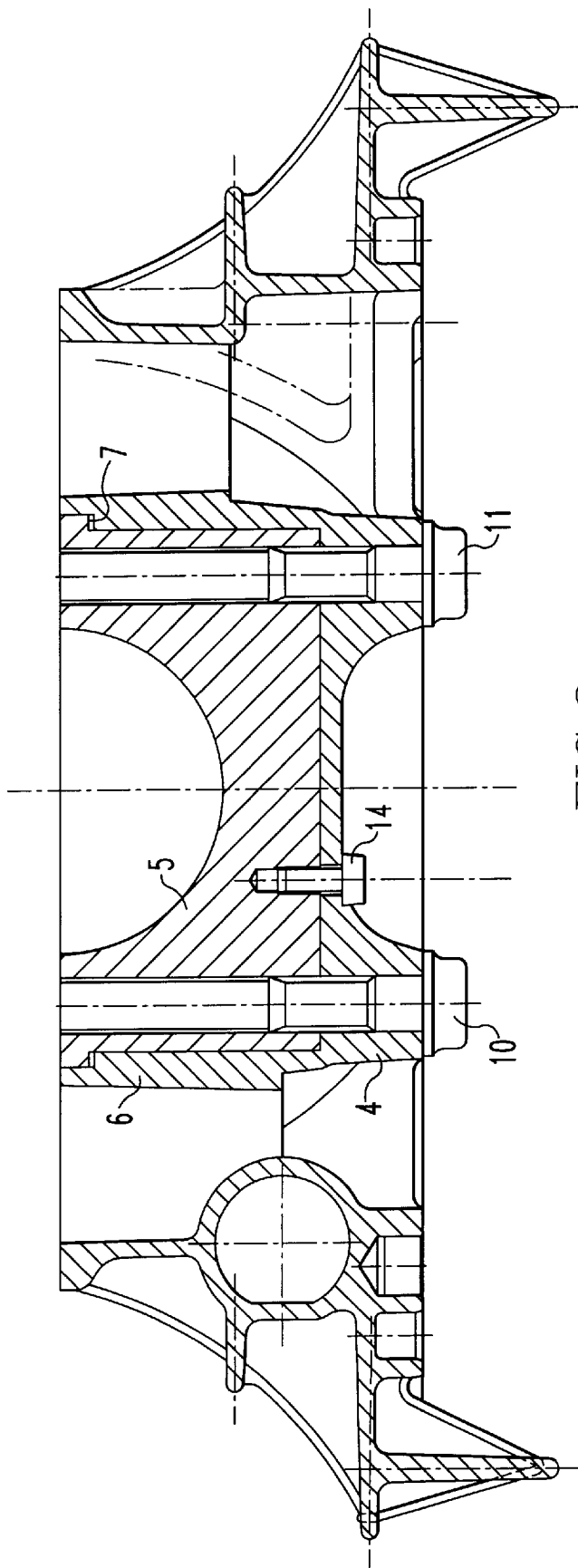
FIG. 2 is a cross-sectional view showing a portion of a crankcase with a second embodiment of the crankshaft bearing.

In the embodiment as shown in FIG. 2, the bearing cover 4 and the insert 5 are mounted to the bearing base portion of the crankcase by only two bearing bolts 10, 11. The bearing cover 4 and the insert 5 are interconnected by an additional short break-off screw 14. The insert 5 includes at its sides two steps 6 and 7 which are seated on corresponding shoulders formed on the bearing cover 5. In a vertical direction, that is normal to the longitudinal axis of the crankshaft, there is a small gap between the steps and the support shoulders on the seat of the bearing cover 4.

Figure 3:
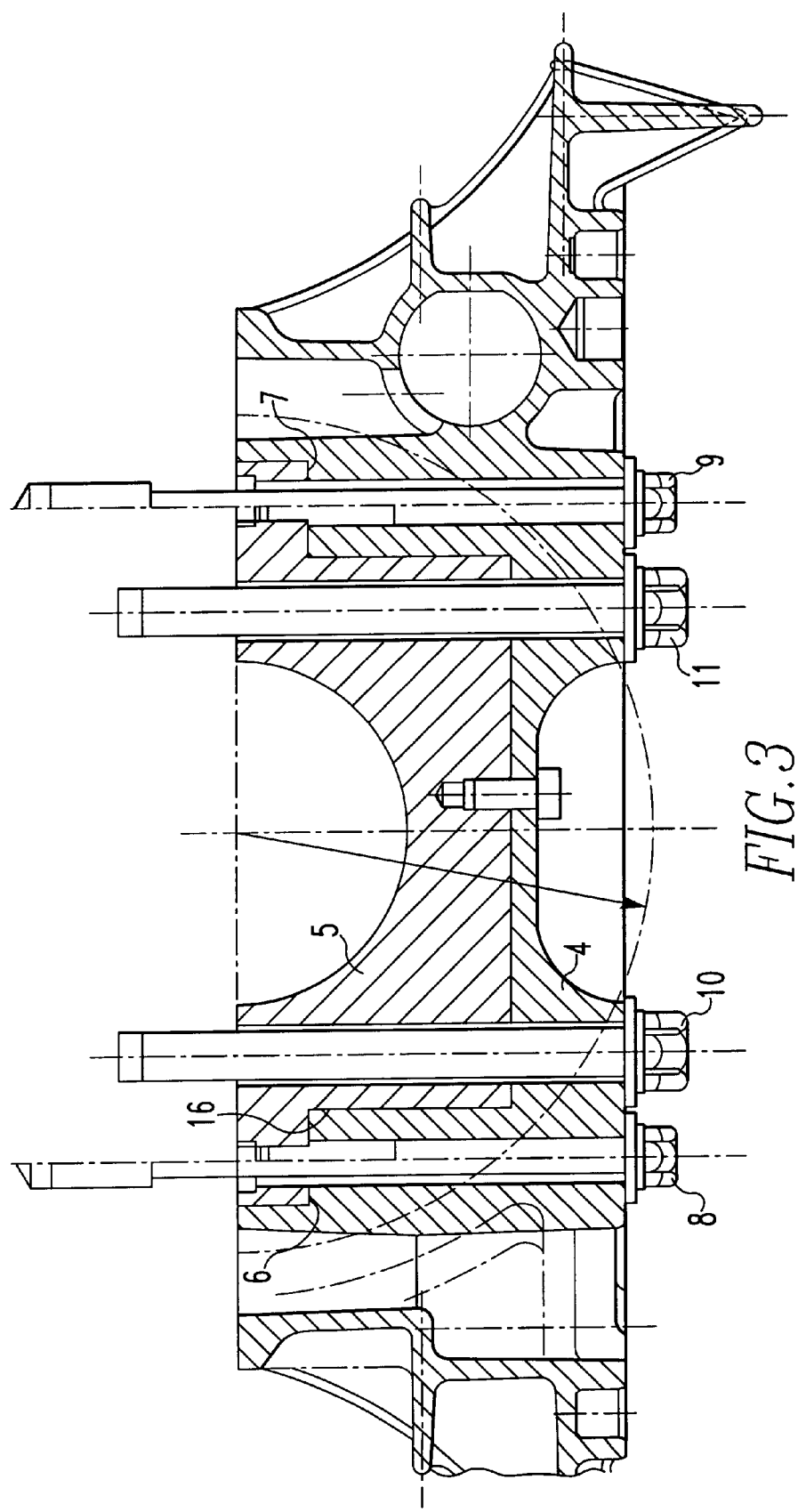
FIG. 3 is a cross-sectional view of a portion of a crankcase including a third embodiment of a crankshaft bearing.

The embodiment as shown in FIG. 3 includes an insert 5 in the bearing cover 4 which again has steps 6, 7 at the side thereof. A bolt 8, 9 extends through each stepped portion to mount the bearing cover 4 and the insert 5 firmly to the bearing base portion. The additional bolts 10, 11 extend through the main body portion of the insert 5.

Between the side surfaces of the main body portion of the insert and the area in the cover accommodating the insert 5, there is a small air gap 16.

Figure 4:
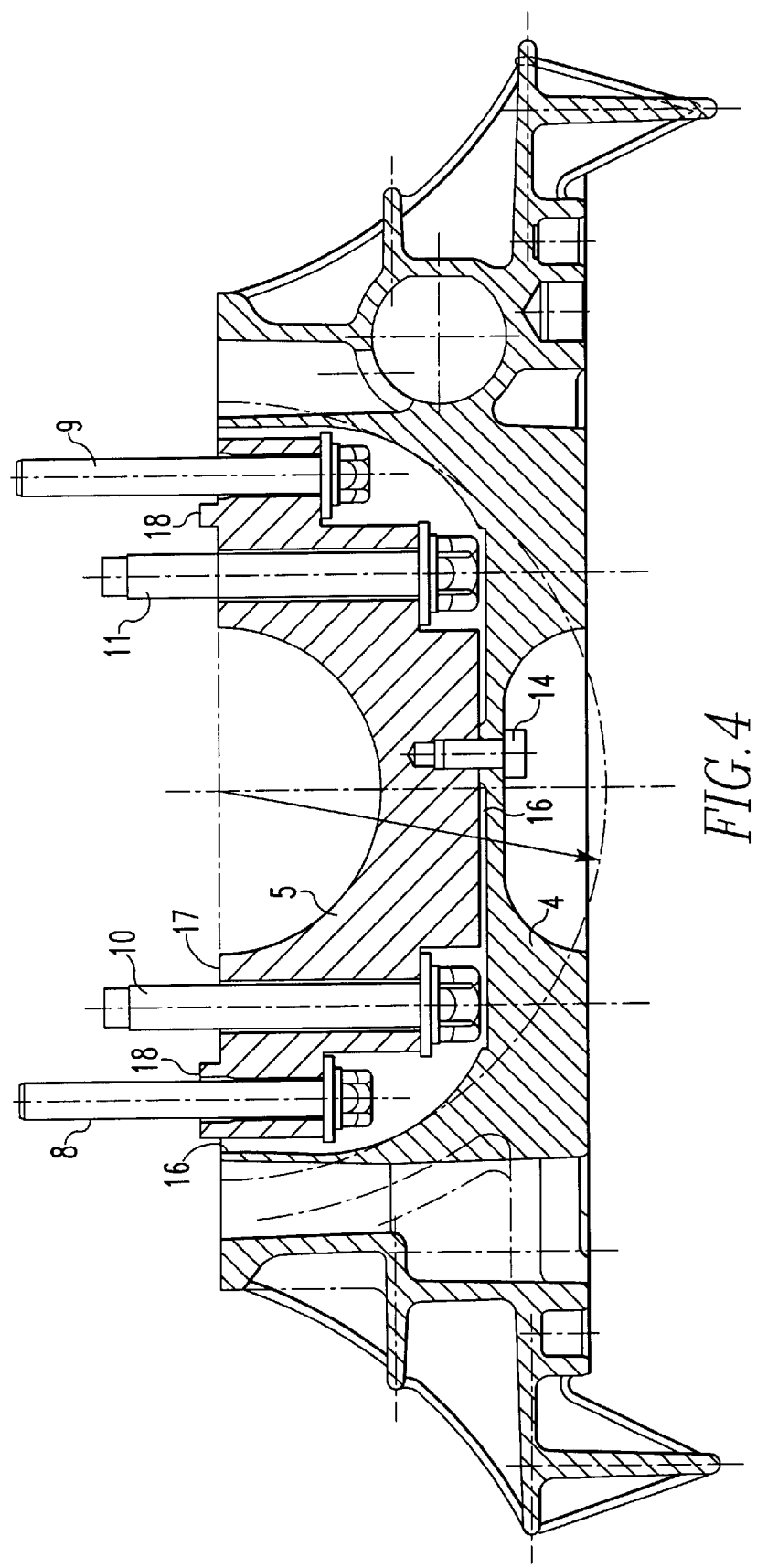
FIG. 4 is a cross-sectional view of a portion of a crankcase including a fourth embodiment of a crankshaft bearing.

As shown in FIG. 4, the bolts 8 to 11 only interconnect the insert 3 and the bearing base portion 5. The bearing cover 4 is not mounted by the bolts 8 to 11. Rather, the bearing cover is connected to the bearing base body 5 by separate bearing bolts, which are not shown. However, the bearing cover 4 may be connected to the insert by screws 14. Between the insert 5 and the bearing cover 4, an air gap 16 is provided which extends all around the insert but is interrupted in the area of the screw 14 for joining the bearing cover 4 and the insert 5. The recess in the bearing cover 4 for receiving the insert 5 is not formed so as to be directly adjacent to the insert 5, but offers sufficient space for receiving the bolt heads of the bearing bolts 8 to the bearing bolts 8 to 11.

In this embodiment, the bearing cover 4 and the insert 5 are substantially isolated from each other whereby heat transfer as well as noise transfer from the insert to the bearing housing are substantially reduced.

The surface 17 of the insert 5 adjacent the bearing base portion 3 is provided with a profiled area 18, which is snugly received in a correspondingly formed profile structure or recess in the bearing base portion. In this way, a firm engagement between the insert and the bearing base portion is provided and assembly is facilitated. The profiled areas 18 may surround the bearing bolts in a ring-like fashion as shown at the left side of FIG. 4 or they may be straight line projections extending from the surface 17 as shown at the right side of FIG. 4.

The crankshaft bearing is assembled in two steps: First, the insert 5 is mounted to the bearing base portion by the bolts 8 to 11. Then the bearing cover 4 is connected to the insert 5 by the screw 14 or to the bearing base by bolts which are not shown in FIG. 4.

What is claimed is:

1. A crankshaft bearing in an internal combustion engine having a crankcase including a bearing base portion, a bearing cover mounted onto said bearing base portion, both said bearing base portion and said cover consisting of a light metal alloy and an insert of a material with a coefficient of thermal expansion which is lower than that of said light metal alloy removably connected to said bearing cover said insert having opposite side walls provided with stepped portions and a mounting bolt extending through each stepped portion for mounting said insert to said bearing base portion.

2. A crankshaft bearing according to claim 1, wherein four mounting bolts are provided for mounting each insert.

3. A crankshaft bearing according to claim 1, wherein a gap is formed between said insert and said bearing cover for insulating said bearing cover from said insert.

4. A crankshaft bearing according to claim 1, wherein one of said insert and said bearing base portion has projections extending therefrom and the other has corresponding recesses adapted to receive the projections when said insert is joined to said bearing base portion.

5. A crankshaft bearing according to claim 1, wherein said insert consists of an iron metallic material.

6. A crankshaft bearing according to claim 1, wherein said insert consists of a compound material.

\* \* \* \* \*